(12) United States Patent
Lee et al.

(10) Patent No.: US 8,732,584 B2
(45) Date of Patent: May 20, 2014

(54) SYSTEM AND METHOD FOR GENERATING AN INFORMATION STREAM SUMMARY USING A DISPLAY METRIC

(75) Inventors: Lawrence Lee, Palo Alto, CA (US); Ed H. Chi, Palo Alto, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 647 days.

(21) Appl. No.: 12/942,771

(22) Filed: Nov. 9, 2010

(65) Prior Publication Data

US 2012/0117475 A1 May 10, 2012

(51) Int. Cl.
*G06F 3/00* (2006.01)
*G06F 3/048* (2013.01)

(52) U.S. Cl.
USPC ............................. 715/733; 715/745; 715/789

(58) Field of Classification Search
USPC .................................. 715/733, 719, 723, 730
See application file for complete search history.

(56) References Cited

U.S. PATENT DOCUMENTS

| | | | |
|---|---|---|---|
| 2008/0098301 A1* | 4/2008 | Black et al. | 715/234 |
| 2009/0327100 A1* | 12/2009 | Greenberg et al. | 715/720 |
| 2011/0191691 A1* | 8/2011 | Spears | 715/748 |

* cited by examiner

*Primary Examiner* — Weilun Lo
*Assistant Examiner* — Truc Chuong
(74) *Attorney, Agent, or Firm* — Patrick J. S. Inouye; Krista A. Wittman; Makiko Coffland

(57) ABSTRACT

A system and method for generating an information stream summary using a display metric is provided. An information stream including a plurality of information stream items is received. A display metric is calculated for each of the plurality of information stream items. The information stream items are grouped into one or more summary objects. A size is assigned to each of the one or more summary objects and the one or more summary objects are displayed based on the assigned size.

18 Claims, 5 Drawing Sheets

SYSTEM AND METHOD FOR GENERATING AN INFORMATION STREAM SUMMARY USING A DISPLAY METRIC

FIELD

This application relates in general to management of electronic information, and in particular, to a system and method for generating an information stream summary using a display metric.

BACKGROUND

Information overload is a growing concern as the amount of information sources available and received electronically, for example, through the Internet has exponentially grown. People face the challenge of keeping track of numerous streams of information from a variety of sources, such as email messages from work colleagues and friends, news stories, status updates from networking sites, and changes to shared electronic files, such as documents in content management systems. Each of the information sources can require visiting a different Web site or tool, including input of a separate username and password to access each source.

As the popularity of social networking sites increases, the number of messages transmitted daily also increases. For example, the number of tweets transmitted per hour via Twitter has already risen well above two million. Due to the number of messages transmitted, users are having difficulty reviewing all the messages received. Sorting through and reviewing received messages can be very time consuming, even after a short period of time away. The ratio of noise to useful information can be quite high as many messages received are related to social aspects, rather than substantive interesting information. The messages can include links to photographs, articles, or other Websites, which can include substantively relevant and interesting information. However, failure to review all messages can result in missing important or interesting information.

Really Simple Syndication (RSS) has developed as a way to avoid the time and effort needed to manually visit each information source individually. RSS is Web-based format for publishing content and allows feed reader applications to gather information published using RSS from a variety of sources and to present the information to a user for monitoring and review. The feed reader application regularly collects information updates from sources, or feeds, subscribed to by the user of the feed reader. Unfortunately, subscribing even to a few feeds can quickly lead to feed overload. Reviewing hundreds or thousands of feed items can be daunting and identifying any feed items of particular interest to the user can be lost in the noise.

Additionally, some information sources, such as the Facebook News Feed, provide a subset of information to the user based on recommendation filters to alleviate some of the information overload. However, the subset dynamically updates and when a user click through a particular piece of information in the subset to get further details and then clicks back into the subsct, the information stream has updated and the valuable information can be lost downstream.

Accordingly, there is a need for management of information streams that includes providing a high level summary of the information in the stream and highlighting the potentially most important information while retaining user control.

SUMMARY

A display metric is determined for each information stream item in an information stream. The information stream items are grouped into summary objects. The summary objects are sized for display based on the total display metric of the information stream items within the summary object.

An embodiment provides a system and method for generating an information stream summary using a display metric. An information stream including a plurality of information stream items is received. A display metric is calculated for each of the plurality of information stream items. The information stream items are grouped into one or more summary objects. A size is assigned to each of the one or more summary objects and the one or more summary objects are displayed based on the assigned size.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Reviewing and keeping up with information received via messages in a communication medium, such as social networking sites, can be difficult and time consuming due to large amounts of content that is dynamically updated. Providing a summary of the information stream and highlighting the most interesting or relevant information greatly minimizes the time required by a user to locate and review the same information.

Figure 1:
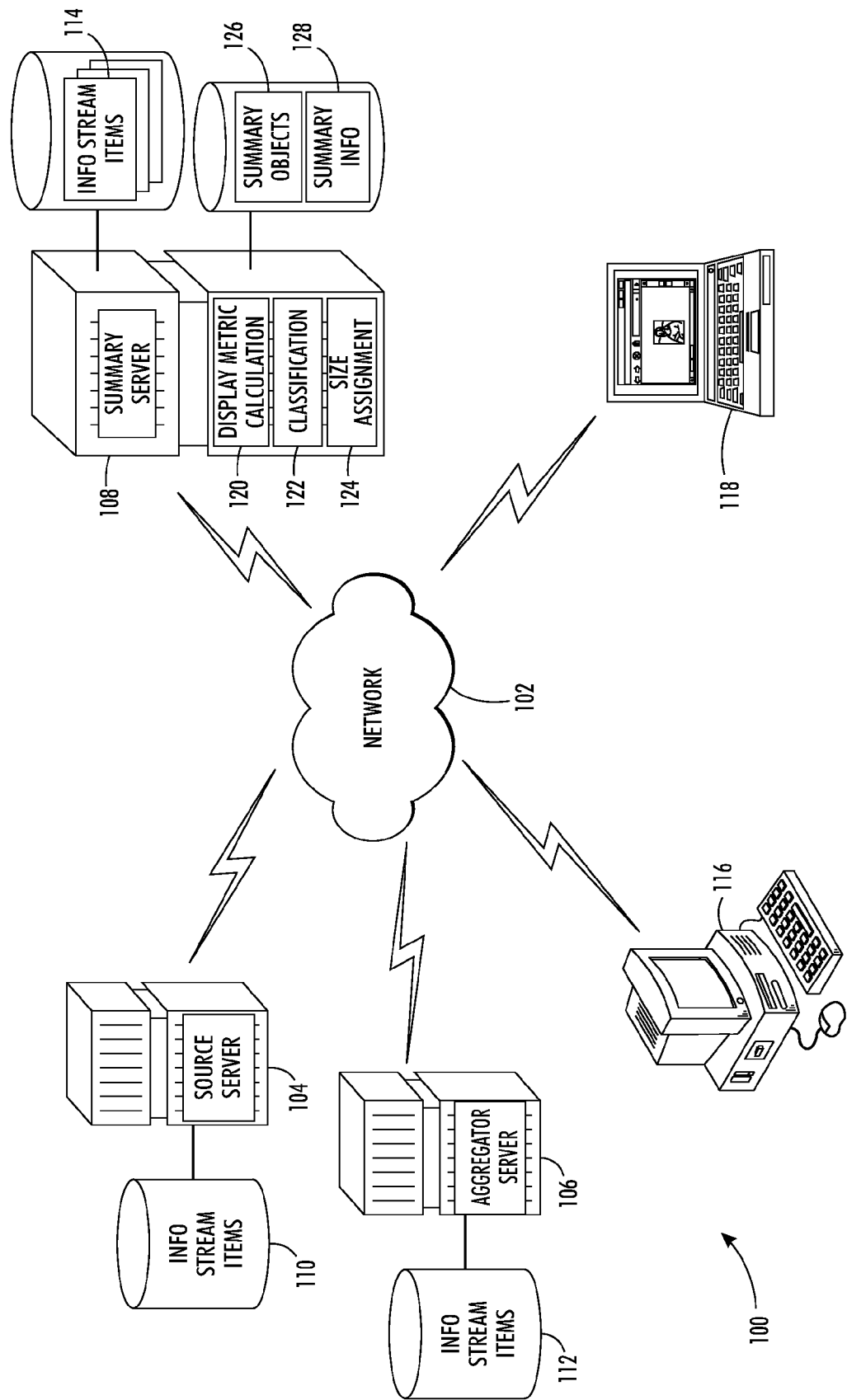
FIG. 1 is a block diagram showing a system for generating an information stream summary using a display metric, in accordance with one embodiment.

Content from information streams is analyzed and sized for display to a user based on a display metric. FIG. 1 is a block diagram showing a system 100 for generating an information stream summary using a display metric, in accordance with one embodiment. A digital data communications network 102, such as the Internet, provides an infrastructure for exchange of digital information. Other digital information exchange infrastructures, for instance, a non-public corporate enterprise network, are possible. The network 102 provides interconnectivity to diverse and distributed information sources and users that respectively supply and consume the digital information. Users continually post articles, Web pages, send emails, and the like to the network 108, which are maintained as a distributed data corpus through one or more source servers 104, feed aggregator servers 106, summary servers 108, and other data repositories that serve as information sources. These sources respectively serve information stream items 110, 112, 114, and other information to users that access the network 102 through user devices 116, 118. User devices can include desktop personal computers 116, laptop personal computers 118, and handheld devices, such as mobile telephones and mobile Internet devices (not shown).

Information stream items 110, 112, 114 are created by users or automatically generated, and can include emails, news content, status updates from networking sites, such as Facebook and Twitter, and notifications of changes to electronic files, such as documents in content management systems. Other types of information stream items 110, 112, 114 are possible. Information stream items 110, 112, 114 can be received directly on user devices 116, 118, for user review via a user interface from a source server 104 or information stream items from many sources can be aggregated, cached, and accessed by user devices 116, 118, from other servers 106, 108.

Information is summarized from the information stream items 110, 112, 114 and used to populate a browser, or other user interface, as user selectable elements. The extracted information can include information regarding the creator, source, time, and topics of the information stream items 110, 112, 114. The information stream items are displayed to the user for review and manipulation. The user can select one or more of the information stream items 110, 112, 114 to view additional information about the information stream items 110, 112, 114 displayed down to the selected information 128, as further discussed below beginning with FIG. 2

A user receives information stream items 110, 112, 114 from one or more information sources. Subsequently, a summary server 108 generates a summary of the information stream items using social attention data. The summary server 108 includes a display metric calculation module 120, a classification module 122, and a size assignment module 124.

The display metric calculation module 120 receives the information stream items 110, 112, 114 from the one or more information sources and determines a display metric for each information stream item 110, 112, 114. The classification module 122 classifies and groups individual information stream items 110,112, 114 into summary objects 126 for display in the information stream summary. Optionally, the classification module 122 can extract summary information 128 from the information stream items 110, 112, 114 that can be associated with the summary objects 126. The summary objects 126 and summary information 128 can be dynamically determined or stored for later retrieval. The size assignment module 124 aggregates the display metrics for all information stream items 110, 112, 114 within an individual summary object 126 and determines the size that each summary object 126 will be displayed to the user on the user device 116, 118.

In general, each user device 116, 118, is a Web-enabled device that executes a Web browser or similar application, which supports interfacing to and information exchange and retrieval with the servers 104, 106, 108. Both the user devices 116, 118, and servers 104, 106, 108 include components conventionally found in general purpose programmable computing devices, such as a central processing unit, memory, input/output ports, network interfaces, and non-volatile storage, although other components are possible. The devices 104, 106, 108, 116, 118, can include one or modules for carrying out the embodiments disclosed herein.

The modules can be implemented as a computer program or procedure written as source code in a conventional programming language and presented for execution by the central processing unit as object or byte code. Alternatively, the modules could also be implemented in hardware, either as integrated circuitry or burned into read-only memory components. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components. Moreover, other information sources in lieu of or in addition to the servers 104, 106, 108, and other information consumers, in lieu of or in addition to user devices 116, 118, are possible.

Figure 2:
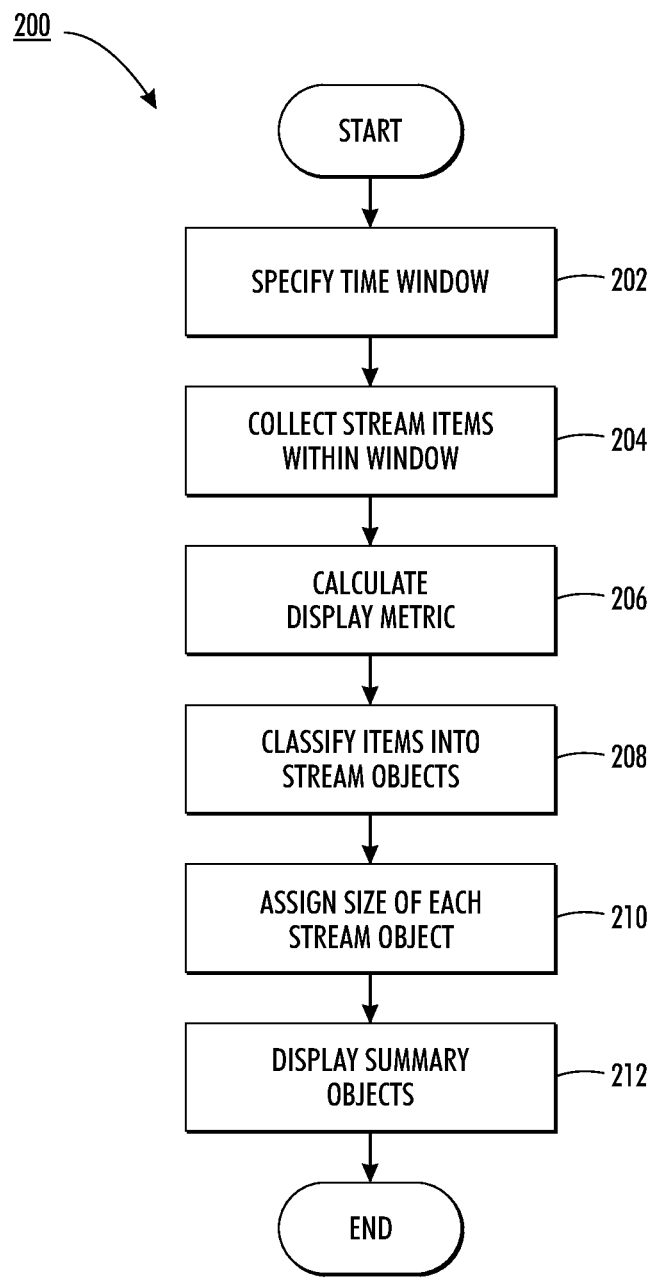
FIG. 2 is a flow diagram showing a method for generating an information stream summary using a display metric, in accordance with one embodiment.

Information stream items 110, 112, 114 are displayed to a user based on a calculated display metric. FIG. 2 is a flow diagram showing a method for generating an information stream summary using a display metric, in accordance with one embodiment. Information stream items 110, 112, 114 are received from information stream sources. The feeds can be received from a feed aggregator 106, for example, through the FriendFeed application programming interface (API), via a summary server 108, or directly from the feed sources 104, such as Twitter and Facebook, and organized for presentation in the user interface. Other ways of receiving and aggregating feeds are possible.

To aid the user in reviewing the information stream items 110, 112, 114, a time window is specified (block 202) and all the information stream items 110, 112, 114 received by the user during the specified time window are collected (block 204). The time period can be manually chosen by the user or automatically determined. For example, the time window may be all information stream items 110, 112, 114 received since the last time the user used the system 100 or those that have been received in the last hour. Other time windows are possible. The information stream items 110, 112, 114 can be collected dynamically as received by the user, stored as received and retrieved from a cache as needed, or otherwise stored for later retrieval.

Each of the collected information stream items 110, 112, 114 within the specified time window are analyzed and a display metric is calculated for each item 110, 112, 114 (block 206). The display metric is used to determine the interest that a particular information stream item 110, 112, 114 relative to the other information stream items 110, 112, 114 will have for a user. Although discussed in relation to a particular information stream source, the same process can be applied to multiple information stream sources and displayed to the user.

In one embodiment, a social attention metric is used to calculate the display metric. The social attention metric utilizes the overall social attention given an information stream item 110, 112, 114 relative to the other information stream items 110, 112, 114 by users of the information stream. The social attention can be from the entire collection of users of the information stream or a subset, such as a particular user's friends or followed users. The social attention can be from both private data not generally available to users and public data that generally are available to users. For example, private data includes click-through rates of links, such as hyperlinks, associated with an information stream item 110, 112, 114. Public data can include user comments added to a status update on a social networking website, and a "like" on a photo posted to a photo sharing website. Other public and private data are possible.

The total display metric of all of the information stream items 110, 112, 114 within the time window is a set amount, such as 100%. Each information stream item 110, 112, 114 display metric is then determined relative to the set amount. For example, the number of comments associated with each information stream item 110, 112, 114 and the total number of comments for all items 110, 112, 114 is calculated. Each information stream item 110, 112, 114 display metric is calculated as an amount relative to the total number of comments. An information stream item 110, 112, 114 with five comments where the total comments for all information stream items 110, 112, 114 is 20 has a display metric of 0.25, or 25%. Additionally, if an information stream item 110, 112, 114 has multiple types of social attention from users, such as comments, likes, and reposts, the various types are combined to determine the display metric of the information stream item 110, 112, 114. Other ways of determining the display metric are possible.

In a further embodiment, a relative degree of interest metric is calculated. While the social attention metric is based on a deterministic count of social attention actions on particular information stream items 110, 112, 114, the relative degree of interest metric is a probabilistic determination of what information stream items 110, 112, 114 an individual user may find interesting. The relative degree of interest metric uses a recommendation algorithm to assign a ranking to each information stream item 110, 112, 114, such as described in commonly-assigned U.S. patent application, entitled "System and Method for Recommending Interesting Content in an Information Stream," Ser. No. 12/757,929, filed Apr. 9, 2010, pending, and U.S. Pat. No. 6,944,830, entitled "System and Method for Browsing Hierarchically Based Node-Link Structures Based on an Estimated Degree of Interest," issued Sep. 13, 2005, the disclosures of which are incorporated by reference. Other types of display metrics are possible.

The relative degree of interest metric calculates the display metric of information stream items 110, 112, 114 to display based on previous interest shown by the user to similar information stream items 110, 112, 114. The parameter of the previous interest, for example, can be topic, media, social, or popularity based. For example, the topic or topics of items 110, 112, 114 that the user has previously clicked on to read can be determined and a higher display metric can be assigned to items 110, 112, 114 within the time window that have similar topics, while those with topics generally ignored by the user can be assigned a lower display metric. Similarly, if the user views information stream items 110, 112, 114 that are photos but does not generally view ones that are videos, photos can be assigned a higher display metric. The information stream items 110, 112, 114 that the user's friends, or other social parameter, view can be ranked higher as well. Other user interest parameters are possible.

In a further embodiment, the relative degree of interest metric can be improved over time through machine learning and training. What the user actually views, or otherwise shows interest, in the summary can be compared to the predicted interest, and the associated metric, and fed back into the system to improve the quality of the predictive power of the relative degree of interest metric.

The information stream items 110, 112, 114 are classified and grouped into summary objects 126 (block 208). The information stream items 110, 112, 114 can be grouped prior to, or after, determining the metric for the items 110, 112, 114. Summary objects 126 organize information stream items 110, 112, 114 into higher-level groupings that are meaningful to the user and allow the user to understand and makes sense of the content within the information stream. Summary objects 126 can be the same or different depending on the information steam or the content within the stream within the given time window, such as further discussed below beginning with reference to FIG. 3. For example, an information feed from a social networking site can have summary objects 126 for friends, likes, and links while a corporate enterprise information stream may have groups, projects, and documents as summary objects.

The information stream items 110, 112, 114 can be classified and grouped in a number of ways. In one embodiment a topic identification algorithm that classifies each information stream item 110, 112, 114 into a topic and then clusters the topics into higher level categories, such as summary objects 126, is used, such as described in commonly-assigned U.S. patent application, entitled "System and Method for Identifying Topics for Short Text Communications," Ser. No. 12/646,810, filed Dec. 23, 2009, pending, the disclosure of which is incorporated by reference. In a further embodiment, the clustering is based on Scatter-Gather, such as described in U.S. Pat. No. 5,422,778, entitled "Scatter-Gather: A Cluster-Based Method and Apparatus for Browsing Large Document Collections," issued Aug. 15, 1995, the disclosure of which is incorporated by reference. Other clustering algorithms are possible, for example, multi-modal clustering of textual content and metadata features, hierarchical clustering, and k-means.

In a still further embodiment, summary information 128 associated with each information stream item 110, 112, 114 in the summary objects 126 is extracted and can be displayed to the user. The summary information 128 can be extracted from metadata associated with, or content of, the information stream item 110, 112, 114, as described further below with reference to FIGS. 3 and 4. For example, a document summary object 126 can include summary information 128 regarding title of the document, a thumbnail image of the document's first page or another salient image from the document's content or related to the document's content, when and who made recent change to the document, and any user comments regarding the document.

Additionally, the categorization transforms non-hierarchical information stream items 110, 112, 114 into hierarchical information as summary objects 126. The categorization allows a user to explore the information stream summary in varying level of detail while retaining display of all information within the information feed within the selected time window, as described further below with reference to FIG. 5.

The summary objects 126 of the information feed are assigned a size for display based on the information stream items 110, 112, 114 they contain (block 210). The summary objects 126 are then displayed to the user based on their determined size (block 212), as further discussed below with reference to FIG. 4. The display metrics of all the information stream items 110, 112, 114 in a particular summary object 126 are aggregated and the size of the summary object 126 is relative to the total display metric across all information stream items 110, 112, 114 for the information stream during the time window.

In one embodiment, the size is calculated from the total of the aggregated stream items 110, 112, 114. For example, if the information stream items 110, 112, 114 in a summary object 126 are 33.6% out of 100% of the total display metric, then the size of the summary object 126 is assigned as 33.6% of the total display.

In a further embodiment, the sizes of the summary objects 126 are predetermined, either by the user or automatically by the system 100, and assigned based on the order of the aggregated totals of display metric for the associated information stream items 110, 112, 114. For example, a summary can have a total of three summary objects 126 with the sizes preset to 50%, 30%, and 20% of the total display area. The summary object 126 with the highest aggregated display metric total is assigned to the 50% size, while the second highest is assigned the 30% size, and so forth. In a still further embodiment, particular summary objects 126 are assigned a predetermined size. Other ways of determining size of summary objects 126 are possible.

Figure 4:
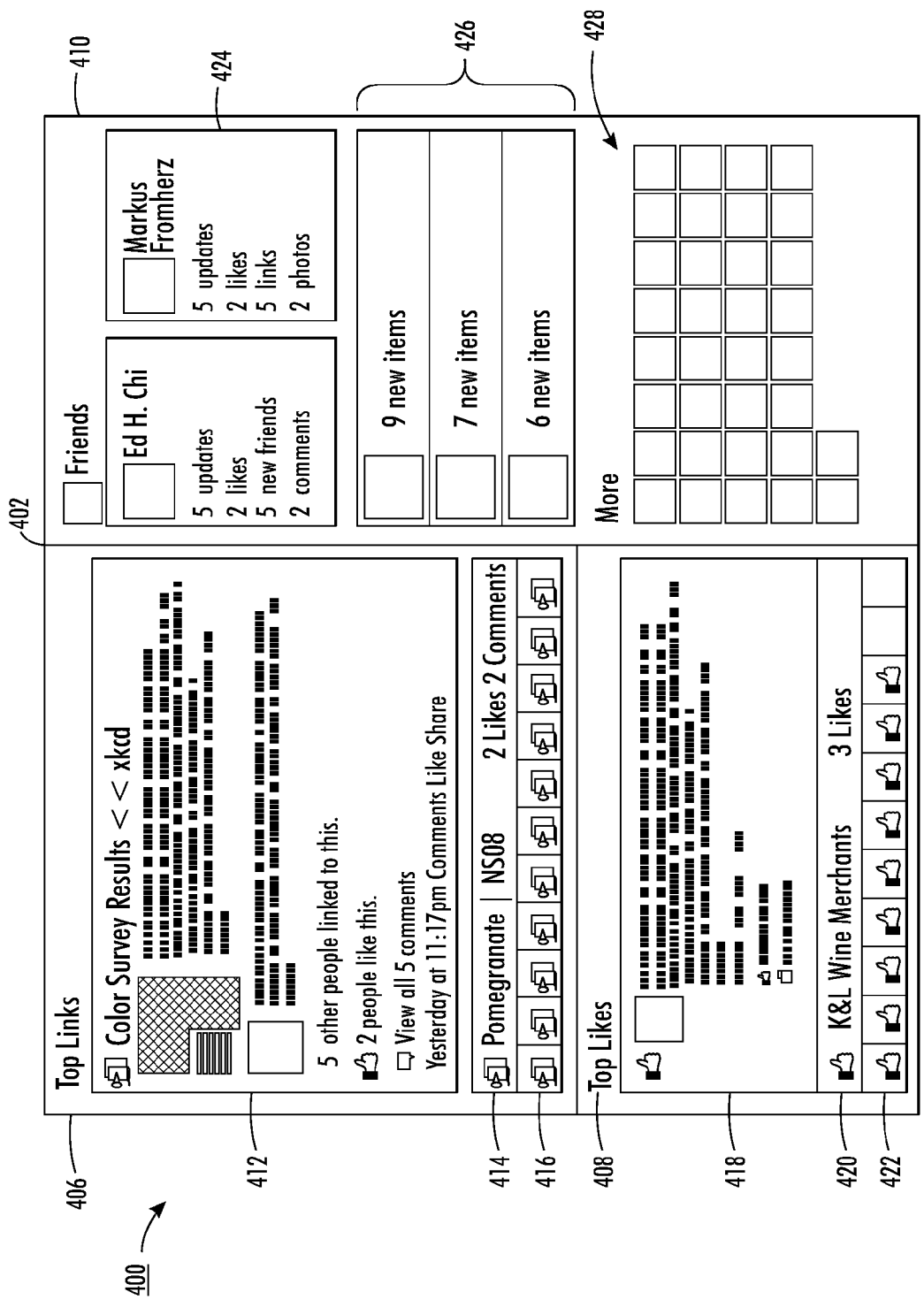
FIG. 4 is a screen shot diagram showing, by way of example, a user interface for generating an information stream summary using a display metric.

In a still further embodiment, the display sizes of individual information stream items 110, 112, 114 within a particular summary object 126 can assigned in the same ways as the summary objects, as further discussed below with reference to FIG. 4. In a further embodiment, additional visual display cues can be used in conjunction with display size of information stream items 110, 112, 114. For example, color coding, shading, font effects such as bold, italics and font size can provide further prioritization of items 110, 112, 114 for review by the user. Other visual queues are possible.

Figure 3:
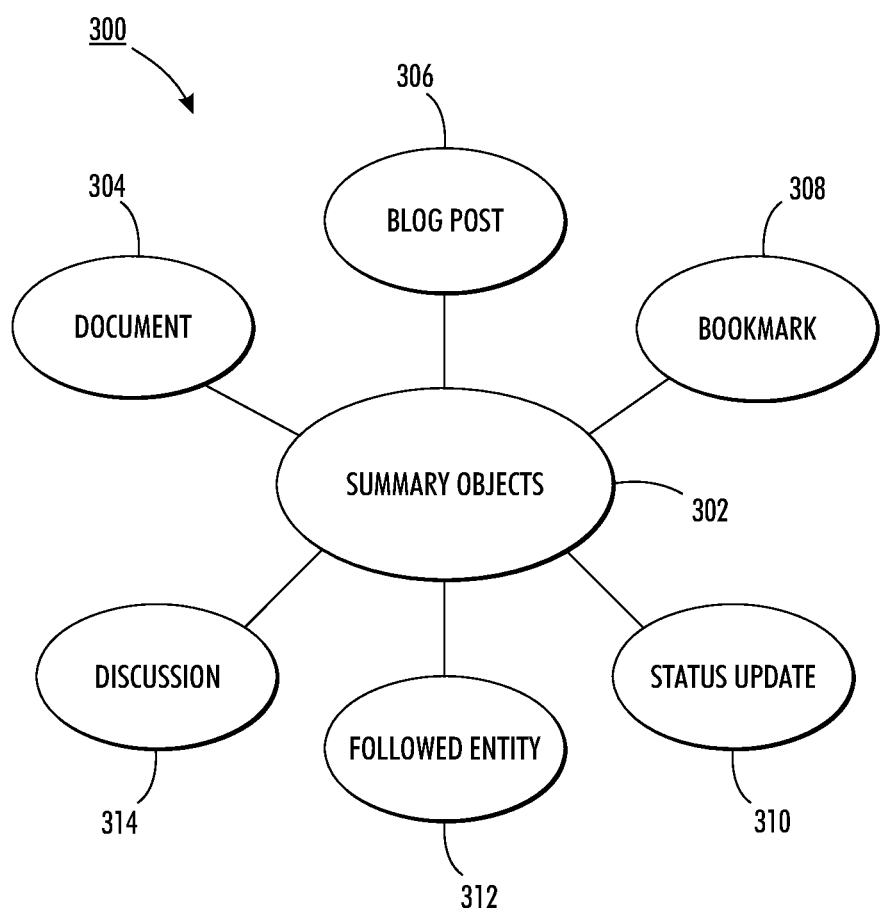
FIG. 3 is a data flow diagram showing types of summary objects, for use with the method of FIG. 2.

Summary objects 302 group together related information stream items 110, 112, 114. FIG. 3 is a data flow diagram 300 showing types of summary objects 302. The summary objects 302 can be the same across information feeds or specific to certain types of information feeds. For example, the summary objects 302 displayed for a social network feed may differ from the summary objects 302 displayed for an enterprise information feed. Summary objects 302 can include document 304, blog post 306, bookmark 308, status update 310, followed entity 312, and discussion 314. Other types of summary objects 302 are possible. For example, a summary object 302 can be an entire information stream source, which is used when a summary from more than one information stream source is displayed.

Document summary objects 304 can include multiple versions of a document in an enterprise information system. Blog post summary objects 306 contain posts to an information feed such as a specific blog or more than one blog associated with a website. Bookmark summary objects 308 include bookmarked websites from a social bookmarking website such as delicious.com, links shared in a microblogging service such as Twitter, or in a social networking site such as Facebook. Status update summary objects 310 include status messages and related comments, such as from Twitter. Followed entity summary objects 312 can include a followed person or followed group, for example, a friend or group from a social networking site, such as facebook.com, and a followed space, such as a specific team or content source in an enterprise information system. Discussion summary objects 314 can include a question posted to a website or to a group within an enterprise and a discussion or comment thread related to that question.

Additionally, summary information 128 is extracted from the information stream items 110, 112, 114, associated with the summary object 302 including the items 110, 112, 114, and displayed to the user, as further discussed below with reference to FIG. 4. Each summary object 302 can have specific summary information 128 extracted and displayed to the user. For example, the document summary object 304 can include summary information 128 for each of the grouped information stream items 110, 112, 114 including title of the document, topics, keywords, or tags associated with the document, notes applied to the documents by users, and activities related to the document, such as new versions or comments to the document. The followed entity 312, such as a followed friend of the user, can include updates to the friend's profile, any additional people the friend is now following, and new photos posted by the friend.

Large number of information streams can be difficult to manage and may prevent a user from quickly finding a desired feed item. The user can manage the information streams by utilizing summary objects for filtering incoming feeds and locating items of particular interest. FIG. 4 is a screen shot diagram 400 showing, by way of example, a user interface 402 for generating an information stream summary using a display metric. Although discussed in relation to a particular information stream source, the user interface and associated summarization and categorization, can be applied to multiple information stream sources. Likewise, the information stream summaries of multiple information stream sources can be displayed simultaneously, as further discussed below with reference to FIG. 5.

User interface 402 can be implemented in a Web-based form, such as in a Web browser, or any other type of software interface. The user interface 402 includes a summary of an information stream during a specified time window including one or more summary objects 406, 408, 410. For example, the information stream can be a social networking Web site and the summary objects can include top links 406, top likes 408, and friends 410. The top links summary object 406 includes information stream items 110, 112, 114 regarding links posted to user pages on the social networking site. The top likes summary object 408 includes information stream items 110, 112, 114, such as posts, links, or photos, that have been "liked" by other users. The friends summary object 410 includes friends of the user who have been active on the website within the specified time window. Other information streams and summary objects are possible.

Summary objects 406, 408, 410 are used to organize the information stream items 110, 112, 114 from the information stream source. The size of the summary objects 406, 408, 410 are based on the determined display metric of the information stream items 110, 112, 114, as discussed above with reference to FIG. 2. For example, the friends summary object 410 accounts for approximately 45% of the total metric for the information feed, while the top links 406 and top likes 408 account for 30% and 25%, respectively. Collectively the display metric for these three summary objects total 100% representing all of the information stream items 110, 112, 114 contained within the stream for the specified time period. The summary objects 406, 408, 410 are then presented to the user in the user interface 402 based on the display metric.

Additionally, the information stream items 110, 112, 114 within a summary object can be presented to the user based on their individual display metric values. For example, the information stream items 412, 418 that have received the most activity, for example from user comments, links, and likes, will have the largest size within the summary object 406, 408. The information stream item 414, 420 with the second highest display metric will be next largest and the rest of the items 416, 422 can be assigned a smaller size. Information stream items 424 and 426 with substantially, or equivalent, display metrics are displayed at the same size. The size can be preset, based on threshold display metric values, or equivalent to the display metric amount of the item 110, 112, 114. For example, the smallest size of an individual information stream item 110, 112, 114 can be set to one pixel. The user can explore the pixel-sized information stream item 110, 112, 114 through interaction with the user interface 402, as described further below with reference to FIG. 5. Other size determinations are possible.

Summary information 128 extracted from the information stream items 110, 112, 114 can be displayed to the user. The summary information 128 shown depends on the size of the summary object 126 and individual item. For example, the largest item 412 in the top links summary object 412 displays summary information 128 including title of the link, a summary of the content of the link, the comment of the user who posted the link, and other information including the number of users who linked to the posting, liked the posting, and commented on the posting. The second largest item 414 only displays a short title for the link and the number of likes and comments. The remaining items 416 only show an icon denoting that a link was posted. Further summary information 128 can be shown to the user through user interaction, such as hovering or mousing over a particular item or summary information 128 and clicking on the item or summary information 128 to get further summary information 128 about the item 110, 112, 114.

Figure 5:
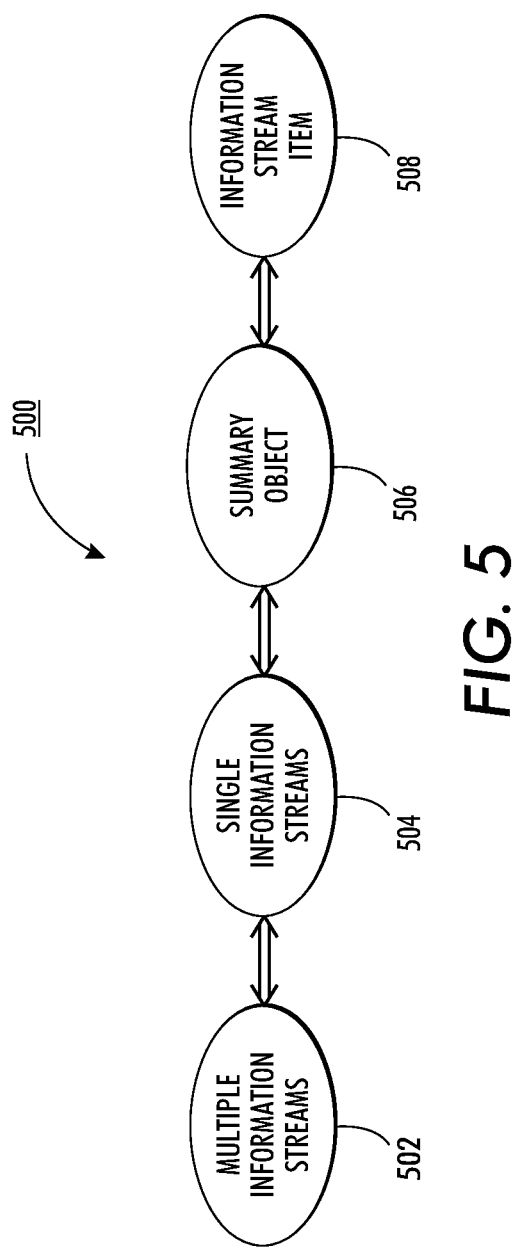
FIG. 5 is a diagram showing levels of user interaction with the user interface of FIG. 4.

The information stream summary provides a complete sense of all activity in the information stream within the time window to the user. FIG. 5 is a diagram 500 showing levels of user interaction with the user interface of FIG. 4. The determination of display metrics and categorization of information stream items 110, 112, 114 into summary objects allows the user to review the information displayed in varying levels of detail. The user can move between each level, from the parent node to the lowest child node, through interaction with the user interface. For example, multiple information streams can be summarized and sized for display to the user (operation 502), as described above with reference to FIG. 2. The user can select one of the information streams, such as Facebook, that was displayed, for example, at 25% of the total display area. Selection can occur by clicking on the information stream, zooming into the information feed, or through other interaction with the user interface. Upon selection, the selected Facebook stream will be resized to 100% of the display area and the summary objects 412 and information stream items 110, 112, 114 are placed within the display based on their display metric relative to the other summary objects 412 and information stream items 110, 112, 114 within the selected stream (operation 504). Additionally, the user can then select a particular summary object 412, such as photographs, which will then be resized to fill the entire display area, while the photograph items 110, 112, 114 are sized based on their display metric (operation 506). Further, an individual photograph can be selected for display within the entire display (operation 508). The user can move back and forth through the layers and the information summary of the selected layer is displayed based on the display metric determined for the selected layer.

While the invention has been particularly shown and described as referenced to the embodiments thereof, those skilled in the art will understand that the foregoing and other changes in form and detail may be made therein without departing from the spirit and scope of the invention.

What is claimed is:

1. A system for generating an information stream summary using a display metric, comprising:
 a central processing unit (CPU) to execute modules, comprising:
  a receiver module to receive an information stream comprising a plurality of information stream items;
  a display metric calculation module to calculate a display metric for each of the plurality of information stream items as an indication of relevance of one such information stream item to a user by measuring social attention given to that information stream item from other users relative to at least one of the remaining information stream items, wherein the social attention is determined based on a relative degree of interest by the user in content of the information stream items by assigning a ranking to each of the information stream items based on a previous interest shown by the other users to information stream items similar to the content;
  a classification module to group the plurality of information stream items into one or more summary objects;
  a size assignment module to assign a display size to each of the one or more summary objects based on an aggregate of the calculated display metric of each of the information stream items within that summary object, wherein the display size of that summary object is relative to the aggregated calculated display metric; and
  a display module to display the one or more summary objects based on the assigned size in a display.

2. A system according to claim 1, further comprising:
 a window module to specify a time window for the information stream and to collect the plurality of information stream items within the time window.

3. A system according to claim 1, further comprising:
 an aggregation module to aggregate the display metric of the information stream items in each of the summary objects, wherein the size assignment module further assigns the size of each of the summary objects from the total of the aggregated display metric of the information stream items within the summary object.

4. A system according to claim 1, further comprising:
 a summary module to extract summary information from each of the information stream items, wherein the display module further displays the summary information with the respective information stream item.

5. A system according to claim 1, further comprising:
 a clustering module to identify a topic within each of the information stream items and to cluster the information stream items into the one or more summary objects based on the identified topic.

6. A system according to claim 5, wherein the clustering is one of scatter-gather, multi-modal, hierarchical, and k-means.

7. A system according to claim 1, wherein the summary object is one of a document, blog post, bookmark, status update, followed entity, and discussion.

8. A system according to claim 1, wherein the social attention comprises visible actions of the other users upon the information stream items.

9. A system according to claim 1, further comprising:
 calculating a relative degree of interest for each of the information stream items based on a previous interest shown by the user in related information stream items.

10. A computer-implemented method for generating an information stream summary using a display metric, comprising:
 receiving an information stream comprising a plurality of information stream items;
 calculating a display metric for each of the plurality of information stream items as an indication of relevance of one such information stream item to a user by measuring social attention given to that information stream item from other users relative to at least one of the remaining information stream items, wherein the social attention is determined based on a relative degree of interest by the user in content of the information stream items by assigning a ranking to each of the information stream items based on a previous interest shown by the other users to information stream items similar to the content;
 grouping the plurality of information stream items into one or more summary objects;
 assigning a display size to each of the one or more summary objects based on an aggregate of the calculated display metric of each of the information stream items within that summary object, wherein the display size of that summary object is relative to the aggregated calculated display metric; and displaying the one or more summary objects based on the assigned size.

11. A computer-implemented method according to claim 10, further comprising:

specifying a time window for the information stream; and
collecting the plurality of information stream items within the time window.

12. A computer-implemented method according to claim 10, further comprising:

aggregating the display metric of the information stream items in each of the summary objects; and
assigning the size of each of the summary objects from the total of the aggregated display metric of the information stream items within the summary object.

13. A computer-implemented method according to claim 10, further comprising:

extracting summary information from each of the information stream items; and displaying the summary information with the respective information stream item.

14. A computer-implemented method according to claim 10, further comprising:

identifying a topic within each of the information stream items; and
clustering the information stream items into the one or more summary objects based on the identified topic.

15. A computer-implemented method according to claim 14, wherein the clustering is one of scatter-gather, multimodal, hierarchical, and k-means.

16. A computer-implemented method according to claim 10, wherein the summary object is one of a document, blog post, bookmark, status update, followed entity, and discussion.

17. A computer-implemented method according to claim 10, wherein the social attention comprises visible actions of the other users upon the information stream items.

18. A computer-implemented method according to claim 10, further comprising:

calculating a relative degree of interest for each of the information stream items based on a previous interest shown by the user in related information stream items.

* * * * *